March 14, 1950        H. J. DEMUTH        2,500,527
AUTOMOBILE AIR COOLING AND VENTILATING SYSTEM
Filed Dec. 19, 1947        3 Sheets-Sheet 1
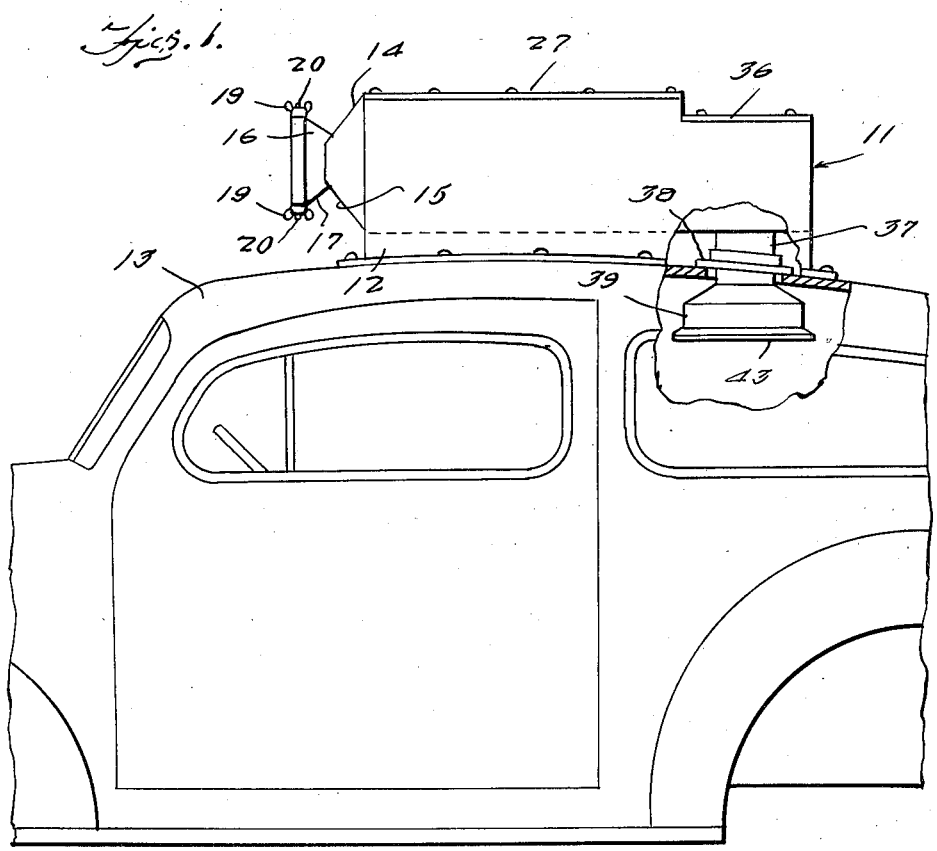
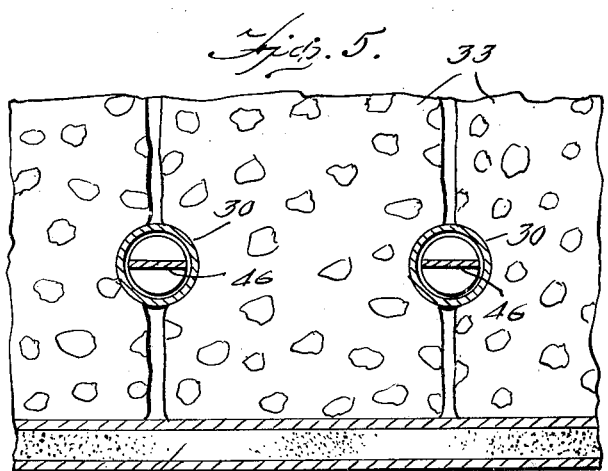
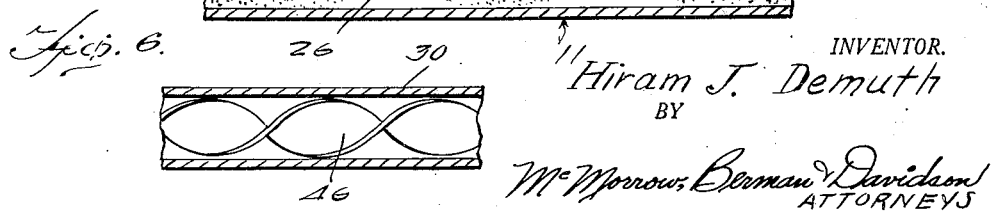
INVENTOR.
Hiram J. Demuth
BY
McMorrow, Berman & Davidson
ATTORNEYS March 14, 1950      H. J. DEMUTH      2,500,527
AUTOMOBILE AIR COOLING AND VENTILATING SYSTEM
Filed Dec. 19, 1947      3 Sheets-Sheet 2
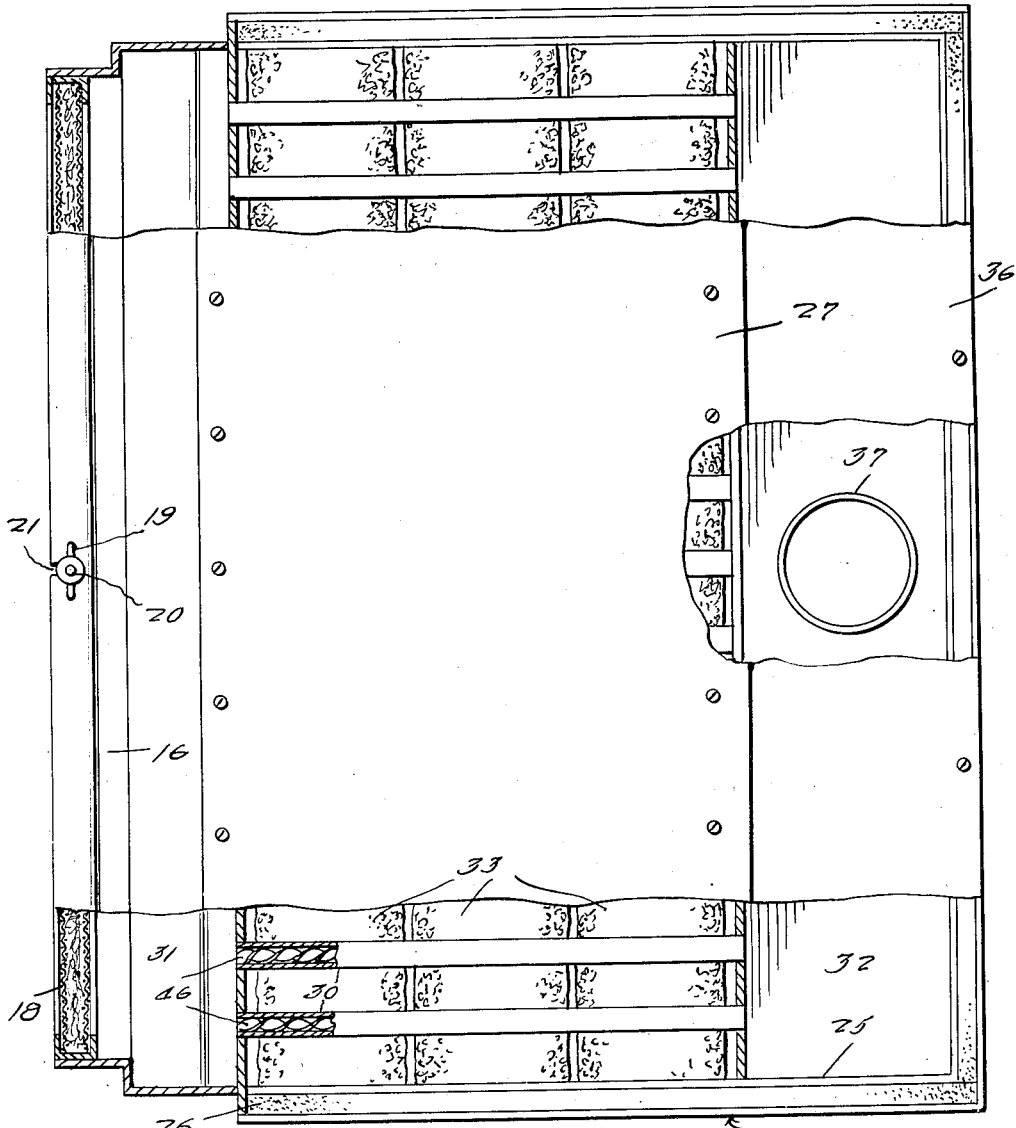
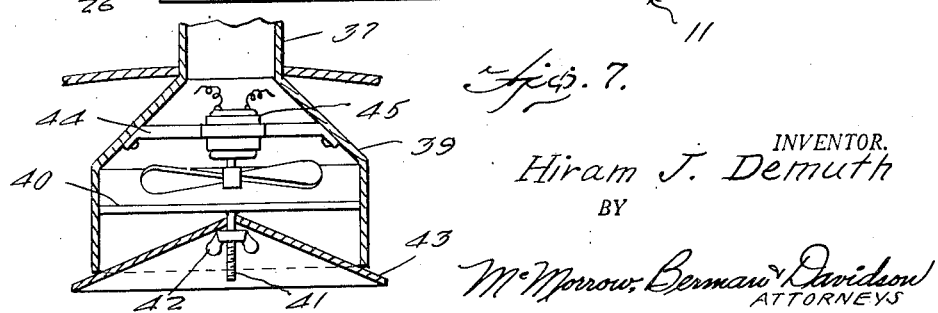
INVENTOR.
Hiram J. Demuth
BY
McMorrow, Berman & Davidson
ATTORNEYS

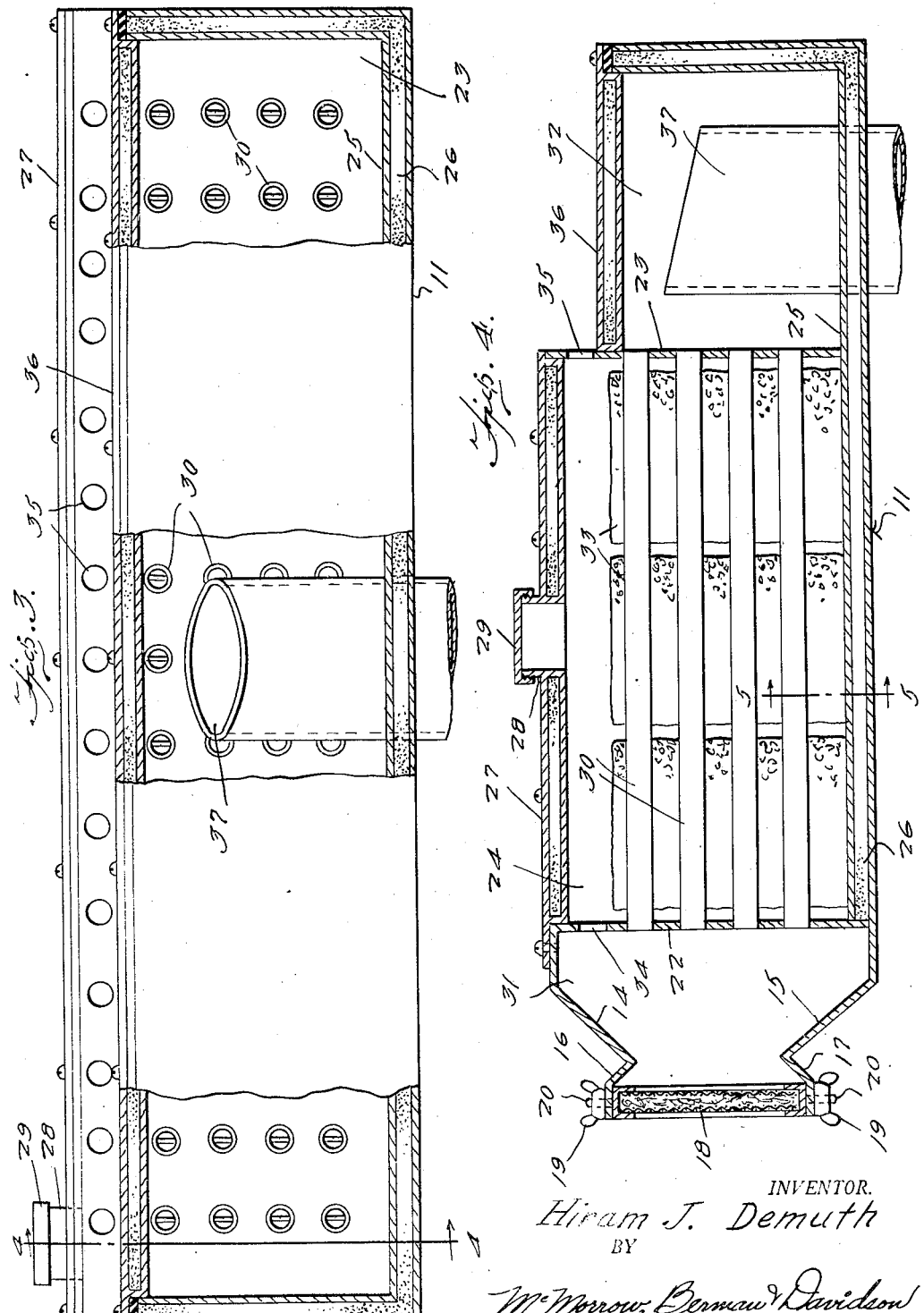

Patented Mar. 14, 1950

2,500,527

UNITED STATES PATENT OFFICE 2,500,527

AUTOMOBILE AIR COOLING AND VENTILATING SYSTEM

Hiram J. Demuth, Enid, Okla.

Application December 19, 1947, Serial No. 792,702

2 Claims. (Cl. 62—154)

This invention relates to ventilating systems for motor vehicles, and more particularly to an air cooler and ventilator for the passenger compartment of a motor vehicle.

A main object of the invention is to provide a novel and improved air cooling and ventilating attachment for motor vehicles which is very simple in construction, easy to install on a vehicle body and which will function over relatively long periods without attention from the vehicle operator.

A further object of the invention is to provide an improved air cooling and ventilating apparatus for motor vehicles which is operated by the intake of air produced by forward movement of a vehicle but which is also operable when the vehicle is standing still, the air being cooled by the evaporation of liquid in the apparatus, said apparatus being relatively inexpensive to manufacture, having a substantial air cooling capacity and being very economical to operate.

Further objects and advantages of the invention will become apparent from the following description and claims, and from the accompanying drawings, wherein:

Figure 1 is a fragmentary side elevational view, partly in cross-section, of an automobile body upon which is installed an air cooling apparatus constructed in accordance with the present invention.

Figure 2 is an enlarged top plan view, partly broken away to show internal structural details, of the air cooling apparatus of Figure 1.

Figure 3 is a rear end elevational view, partly in cross-section, of the air cooling apparatus of Figure 1.

Figure 4 is a vertical longitudinal cross-sectional view taken on line 4—4 of Figure 3.

Figure 5 is an enlarged vertical transverse cross-sectional detail view taken on line 5—5 of Figure 4.

Figure 6 is an enlarged longitudinal cross-sectional detail view taken through one of the air ducts employed in the air cooling apparatus of Figure 1.

Figure 7 is an enlarged vertical cross-sectional detail view taken through the discharge register portion of the air cooling apparatus of Figure 1.

Referring to the drawings, 11 designates a generally rectangular housing constructed of light sheet metal or the like and provided with a flanged base 12, whereby, as illustrated in Figure 1, the housing may be secured by bolts, sheet metal screws, or other suitable fastening means to the top of a passenger car 13. The forward end of housing 11 is formed with tapering top and bottom walls 14 and 15 having respective end flanges 16 and 17 between which is detachably secured an air screen 18, said screen being held in a vertical transverse position between the end flanges 16 and 17 by wing nuts 19 threaded on studs 20 projecting from the top and bottom edges of the screen frame and being received in slots 21 formed in the flanges 16 and 17. Secured in the main body portion of housing 11 are longitudinally spaced transverse partition walls 22 and 23, defining a large intermediate compartment 24 in the housing. Secured in the housing and spaced inwardly from the outer walls thereof is a shell 25. The space between shell 25 and the outer walls of the housing is filled with heat insulating material 26, such as rock wool or the like. The compartment 24 is provided with a removable hollow top cover 27, also filled with heat insulating material. Said cover is formed with a filler spout 28 having removably threaded thereon a cap 29.

Secured to the transverse walls 22 and 23 are a plurality of rows of longitudinal tubes 30 which provide communication between the forward space 31 of the housing and the rearward space 32 thereof. Substantially filling the space in compartment 24 around the tubes 30 are a plurality of sponges 33. Sponges 33 are normally maintained in a saturated condition by a supply of water furnished at occasional intervals by the operator through the filling spout 28. Above the sponges 33 there is a free air space in compartment 24. The upper portion of forward wall 22 of said compartment is formed with a row of apertures 34 to allow air to enter said free air space. The upper portion of rear wall 23 is formed with a row of apertures 35. The top rear wall of housing 11 is downwardly offset, as shown at 36 so that apertures 35 communicate directly with the atmosphere rearwardly of compartment 24.

Designated at 37 is a vertical conduit open at its top end and rising to the upper portion of rear space 32. Conduit 37 extends through the bottom wall of housing 11 and through the roof of the car 13, said conduit being rigidly secured to the housing bottom wall. The conduit 37 is sealed with respect to the roof of the car by a flanged rubber bushing 38 interposed between the conduit and the opening in the car roof through which said conduit passes. The lower end of the conduit carries a flared hood 39. Secured horizontally in the hood is a transverse bracket 40 carrying at its center portion a depending stud 41. Mounted on the stud and adjustably supported by a wing nut 42 threaded on the stud is a conical baffle member 43. By tightening the wing nut 42, the baffle member 43 may be brought into engagement with the bottom edge of the hood 39, thereby closing off said hood from the interior of the car. By suitably adjusting nut 42, the size of the discharge opening defined between the baffle member 43 and the bottom peripheral edge of hood 39 may be regulated as desired.

Secured in hood 39 is a transverse bracket 44 which carries a suction fan 45. When fan 45 is energized air will be drawn by suction through the tubes 30 and conduit 37 into the car interior.

As shown at 46, each tube 30 contains a spiral vane which acts to provide a swirling action of the air passing through the tube, whereby the air is maintained in contact with the walls of the tube and maximum conduction of heat from the air to said tube walls is obtained.

During normal driving, air enters housing 11 through the screen 18 and a substantial portion thereof enters the tubes 30 at forward partition wall 22. The air passes through the tubes and is cooled by contact with the walls thereof. The tubes are cooled by the continuous evaporation of water from the sponges 33. The cooled air enters rear space 32 and passes downwardly through conduit 37 to discharge hood 39.

A certain proportion of the intake air passes through the apertures 34 into the upper space in compartment 24 and exhausts through the rear apertures 35, carrying with it the water vapor given off by the evaporation of water from the sponges 33. The cooling action is produced as a result of said evaporation. Since a substantial amount of water is contained in compartment 24, the sponges continue to remain substantially saturated for a long period of time.

When the car is standing still, the suction fan 45 is employed to provide the draft required to draw air through the tubes 30 into hood 39, as above explained. Said fan is not required when the car is moving at normal speed.

Under rainy conditions water may enter the screen 18 along with the intake air. However, since the top end of conduit 37 is at a relatively high level in rear space 32, the water remains in the housing 11 and does not enter the car.

When it is desired to close the ventilator, wing nut 42 is tightened, as above explained.

Screen 18 may be readily removed for cleaning by loosening the wing nuts 19, 19.

While a specific embodiment of an air cooling and ventilating apparatus for motor vehicles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An air cooling and ventilating apparatus for a vehicle comprising a housing secured on the top of the vehicle, said housing having a forwardly facing air intake opening, means defining a compartment in the intermediate portion of the housing and respective forward and rear spaces adjacent said compartment, a plurality of longitudinal tubes extending through said compartment and connecting said forward and rear spaces, a longitudinal spiral vane in each of said tubes, sponge means in the compartment surrounding said tubes, the upper portion of the compartment communicating at its forward wall with said forward space and communicating at the rear wall of the compartment with the atmosphere, conduit means connecting said rear space with the interior of the vehicle, a conical baffle member on the discharge end of said conduit, and means for adjusting said baffle member in said discharge end of said conduit.

2. An air cooling and ventilating apparatus for a vehicle comprising a housing secured on the top portion of the vehicle, said housing having a forwardly facing air intake opening at its forward end, a pair of spaced transverse partition walls secured in the housing and defining an intermediate compartment therein, a plurality of tubes secured longitudinally between said walls and providing communication between the spaces forwardly and rearwardly adjacent said compartment, sponge means in said compartment surrounding said tubes, the forward transverse partition wall being apertured at its upper portion, the upper portion of the rear transverse partition wall being exposed to the atmosphere and likewise apertured, a conduit connecting the space in said housing rearwardly adjacent said compartment with the interior of the vehicle, a conical baffle member carried at the exhaust end of said conduit, and means for adjusting the spacing between the conical baffle member and the rim of said exhaust end.

HIRAM J. DEMUTH.

REFERENCES CITED

The following references are of record in the file of this patent:

UNITED STATES PATENTS

| Number | Name | Date |
| --- | --- | --- |
| 1,721,589 | Donaldson | July 23, 1929 |
| 2,009,550 | Harris | July 30, 1935 |
| 2,075,389 | Eubank | Mar. 30, 1937 |
| 2,151,097 | Germonprez | Mar. 21, 1939 |
| 2,162,538 | Peo | June 13, 1939 |